Dec. 8, 1936.  M. H. AMES  2,063,016
FILM GATE
Filed Sept. 12, 1931   3 Sheets-Sheet 1

Inventor,
Malcolm H. Ames,
by Roberts, Cushman & Woodberry
Attys.

Dec. 8, 1936.   M. H. AMES   2,063,016
FILM GATE
Filed Sept. 12, 1931   3 Sheets-Sheet 2
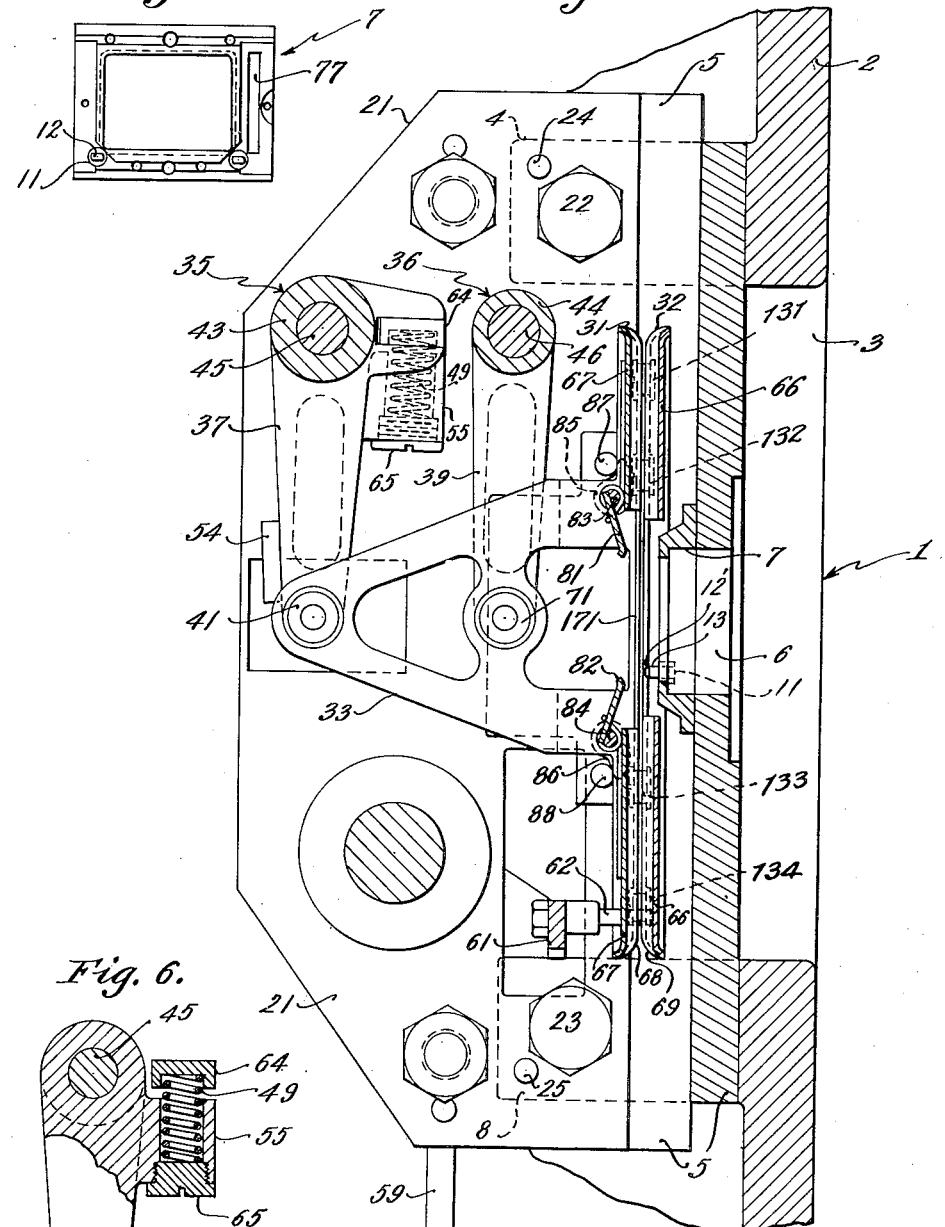
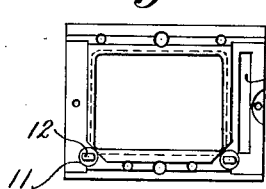
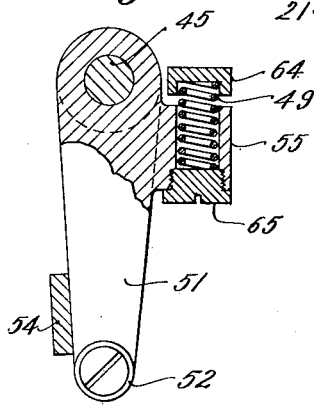
Inventor,
Malcolm H. Ames,
by Roberts, Cushman & Woodberry
Att'ys.

Dec. 8, 1936.                M. H. AMES                2,063,016
                              FILM GATE
                        Filed Sept. 12, 1931         3 Sheets-Sheet 3
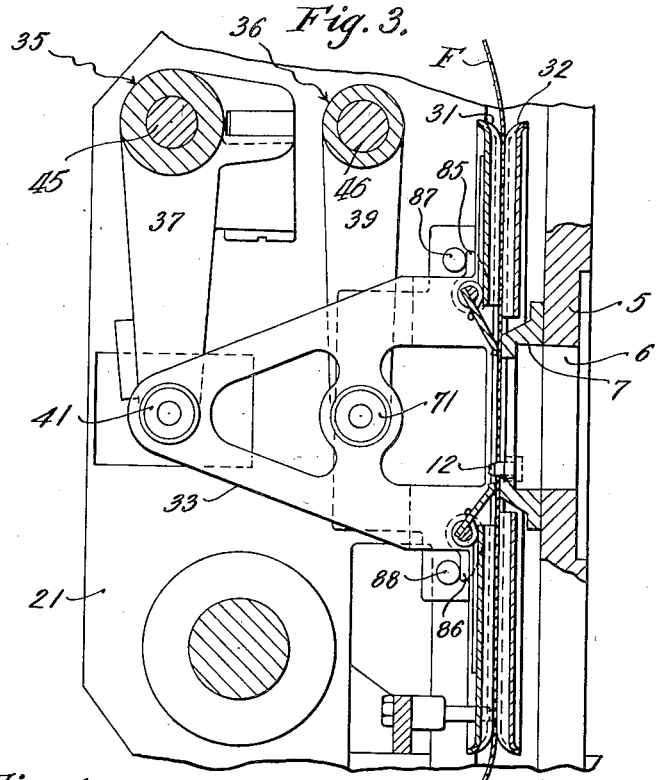
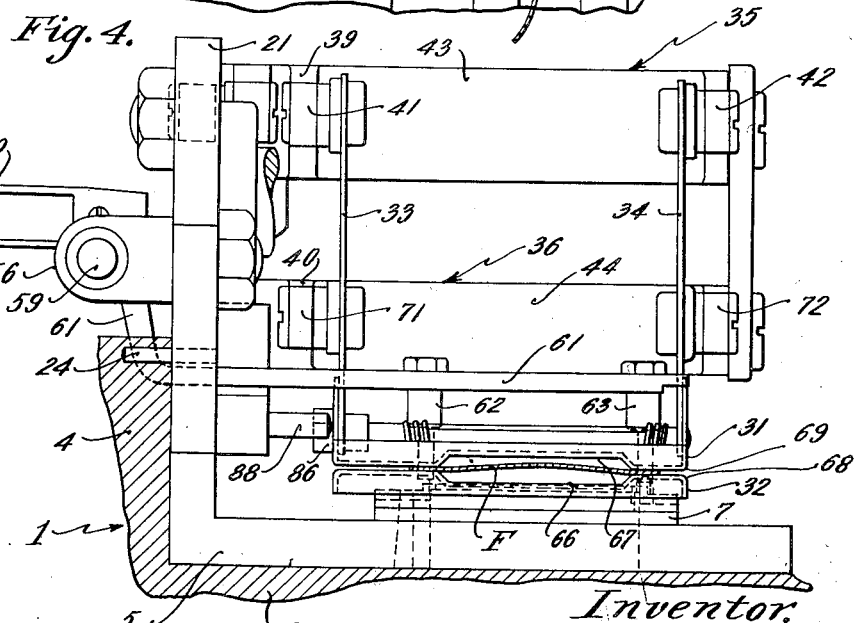
Inventor,
Malcolm H. Ames,
by Roberts, Cushman & Woodberry
Attys.

Patented Dec. 8, 1936

2,063,016

UNITED STATES PATENT OFFICE 2,063,016

FILM GATE

Malcolm H. Ames, Waltham, Mass., assignor, by mesne assignments, to Technicolor, Inc., New York, N. Y., a corporation of Delaware Application September 12, 1931, Serial No. 562,502

8 Claims. (Cl. 88—17)

The present invention deals with improvements of film gates for cinematographic apparatus of the kind which employ oscillating means for transferring the film back and forth between stationary registering pins and reciprocating transport pins. The principal objects of the present invention are to provide a film gate which avoids scratching the film, which often becomes bent or otherwise distorted and is therefore apt to rub on the guiding leaves of the film gate during its progress therethrough, to provide provisions for flattening the film during the printing period and releasing it for substantially frictionless progress (as far as the record area is concerned) during the feeding period and to provide for smooth and unobstructed operation of the device regardless of the thickness of the film. Other objects and advantages of the invention will be apparent from the following description of a specific embodiment thereof by way of example, in connection with the appended drawings in which:

Fig. 2 is a section thereof on line 2—2 of Fig. 1, showing the gate during the film transport period;

Fig. 3 is a similar section showing the gate in the printing position, with only the portions of the device which are in a position different from Fig. 2;

Fig. 4 is a bottom view of the film gate with the apparatus frame sectioned along line 4—4 of Fig. 1;

Fig. 5 is an elevation of the aperture frame; and

Fig. 6 is a section along line 6—6 of Fig. 1.

Figure 1:
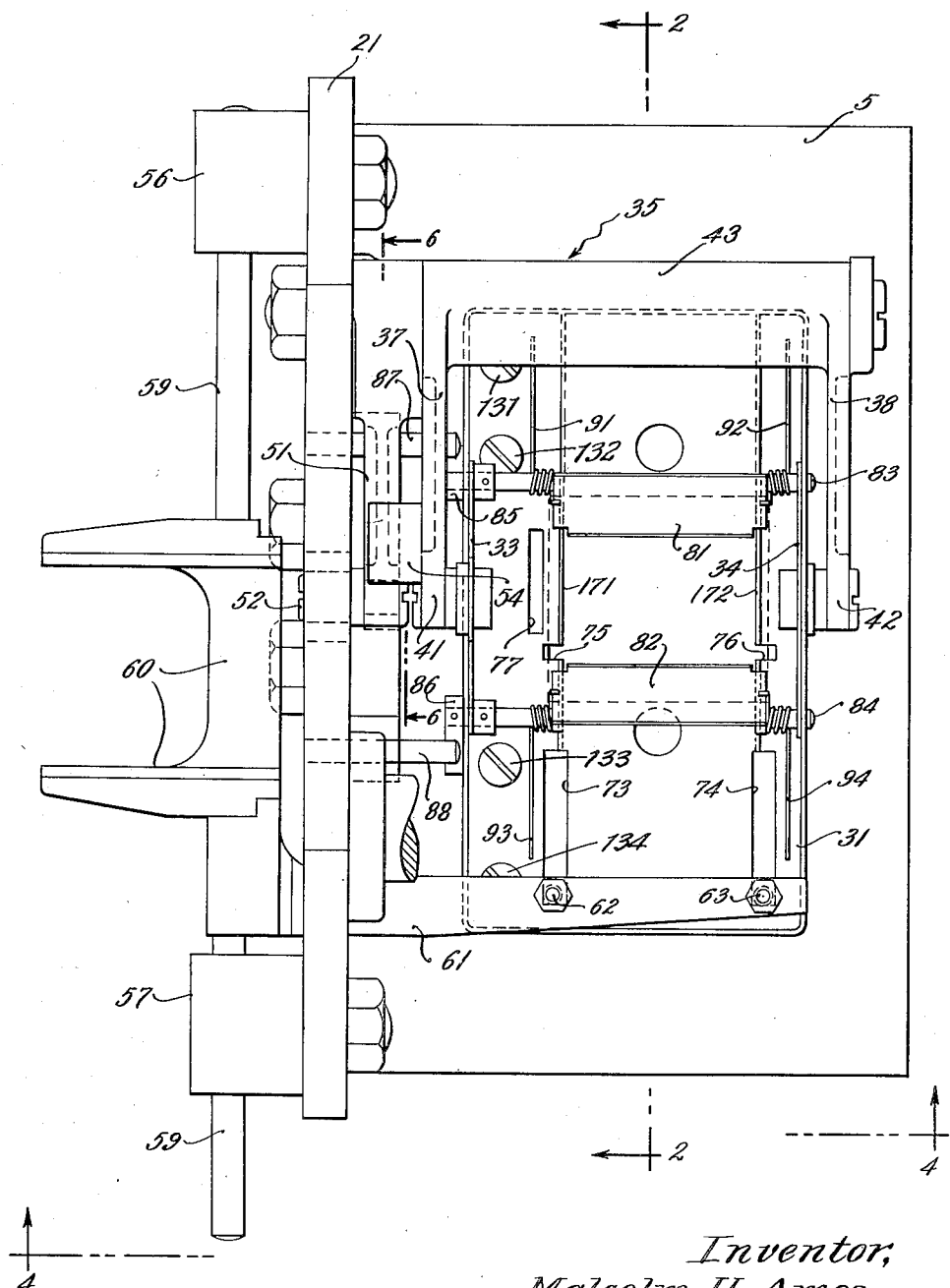
Fig. 1 is a rear elevation of the new film gate.

The embodiment chosen for the purpose of illustration is a film gate for projection printers but it is understood that it can be analogously used in any cinematographic apparatus. I (Figs. 2 and 4) is the frame or housing of the printer, 2 the front part thereof having an aperture window 3, and numerals 4 and 8 denote two machined pads of the housing. 5 is an L-shaped plate with an aperture window 6, which is suitably fastened to the housing. An aperture frame 7 is secured to plate 5 and fixed thereto is a pair of registering pins 11 and 12 (Figs. 2 and 5) which have a conical tip 12' and a body portion 13 exactly fitting into the film perforations.

A plate 21 is fastened by means of screws 22 and 23 to pads 4 and 8 and secured in correct adjustment thereto by positioning pins 24 and 25 (Figs. 2 and 4). The plate 21 supports the entire film movement, which comprises a film guide with two leaves 31 and 32 fixed to two frames 33 and 34 with screws 131, 132, 133 and 134 (Figs. 2 and 4) the frames swinging on two U-shaped oscillators 35 and 36. Each oscillator has two arms 37, 38, 39, 40 to the ends of which the frames are journaled at 41, 71 and 42, 72, and hub portions 43, 44 which rotate on axles 45, 46 fastened to plate 21. In this manner, leaves 31 and 32, forming together a film guide permitting free progress of the film, can be reciprocated with respect to the aperture frame, thereby moving the film between the two extreme positions illustrated in Figs. 2 and 3, respectively.

An arm 51 is independently journaled on oscillator shaft 45 and has a roller or pin 52 (Figs. 1 and 6) which cooperates with a cam or similar device (not shown, as irrelevant to the present invention), and imparts in this manner an oscillating motion to arm 51. Integral with the oscillator hub 43 is an extension 64 which cooperates with a spring 49 in a sleeve housing 55 on oscillator arm 51 and closed by screw 65. Arm 37 has also an extension 54 (Figs. 1, 2 and 6) which is pressed towards oscillator arm 51 by spring 49. The relative positions of arms 37 and 51 are so adjusted that extension 54 rests on arm 37 during the film transport period, but that the extension is somewhat lifted from arm 37 during the exposure period, so that the spring exerts during this period a slight pressure upon the guide and the film, thereby assuring firm contact between aperture frame 7 and leaf 32. Any object of greater thickness than the normal film causes extension 54 to rise still further if the leaf strikes such an obstacle so that the whole oscillator comes to rest earlier, without stopping the progress of arm 51 and the cam driving the same.

Plate 21 further supports two sleeve bosses 56, 57 (Figs. 1 and 3) which guide a rod 59 having a box frame 60 fixed thereto. The box frame cooperates with a cam or eccentric (not shown as not necessary for the understanding of the present invention), which is adapted to reciprocate it between the two bosses. An arm 61 (Figs. 1, 2 and 4) is fastened to frame 60 and two film transport pins 62, 63 are secured to arm 61.

Each of the leaves 31, 32 has a recessed portion 66, 67 (Figs. 2, 4) and marginal film guiding portions 68, 69 which confine the film margins in the plane intermediate thereof, whereas the recessed portions permit free movement of the record area of the film, which is not touched by the leaves even if the film F is considerably distorted as indicated in Fig. 4. The recessed part of the leaves is cut out to form aperture windows, the longitudinal sides 171, 172 (Fig. 1) of leaf 31 forming the shorter sides of the frame of a cinematographic picture. The leaves have further slots 73, 74 for the transport pins and openings 75, 76 for the registering pins. A slot 77 for printing marginal marks may also be provided.

The leaves as so far described, could not possibly mar the record portion of a film passing therethrough, but the longer sides of the film picture would not be held in place during exposure. In order to secure the film firmly and to frame the picture during the standstill period, two rails 81, 82 (Figs. 1 and 2) are eccentrically journaled with their shafts 83, 84 in the upturned borders of leaf 31. The edges of the rails are shaped to be in the same plane with the leaf aperture edges when in closed position. The shafts 83, 84 have cams 85, 86 fixed thereto, which cooperate with stops 87, 88 fastened in plate 21. Springs 91, 92, 93, 94 tend to rotate the framing edges of the rails toward the leaf faces. During the transport period of the film motion cycle, the rails are turned away from the aperture since the cams strike the stops and rotate the rails away from the leaves, as shown in Fig. 2, and the moving film is not obstructed by any part of the movement. As the leaves move the negative forward into the printing position, the rails rotate back flush with the leaves, coming in contact with the film and framing it by pressing it against frame 7, as shown in Fig. 3. The cooperation of spring 49 and rail springs 91, 92, 93, 94 promotes especially good contact at the longer sides of the film picture and therefore assures flatness of the film during exposure.

During a whole cycle of the film motion, the operation of the new device is as follows: During the exposure period the springs press the rail edges against the film which on its other side rests against the fixed aperture frame as shown in Fig. 3. In this manner, the film picture is during the exposure confined and straightened between two substantially closed frames defining the proper optical plane. In this same position, the registering pins engage the film perforations and establish the proper relation between film and optical system. The transport pins are during this period outside of the leaves and move upwardly by means of frame 60 and the device operating the same. At the end of the exposure period, the leaves with the film move away from the fixed aperture, and the registering pins release the perforations, which now engage the transport pins in their upper position. The fixed pin stops 87, 88 engaging the cams 85, 86, turn the rails away from the film thereby releasing its record portion to the same extent as the recessed portion of the leaves, so that the film is free to be transported without danger of being scratched or otherwise injured. The transport pins are now pulling down the film whereupon the leaves are again moved towards the fixed aperture by arm 51, the transport pins release the film, the registering pins engage the perforations, and the cycle starts again.

The spring 49, forming an elastic link between driven arm 51 and the oscillator, prevents any undue stress of the moving parts and equalizes the force with which the leaf aperture, and the film, are pressed against the stationary frame 7. If for example a portion of the film is spliced or otherwise thicker than normal, extension 54 will be lifted higher than normal from arm 51 during the exposure period, in accordance with the thickness of the film, thereby stopping at this point any influence which film irregularities might exert upon the drive of the film movement, providing a uniform film pressure irrespective of the thickness of the film, preventing any deformation of the leaves and cooperating with the rail springs in establishing firm contact between the film, the longer sides of aperture frame 7 and the edges of rails 81 and 82.

It will be apparent that this invention is not limited to the described use with a conventional film gate as herein described, but that it can also be applied to film gates of different general design, and it is expressly understood that the present disclosure is for the purpose of illustration only and that this invention includes all modifications and equivalents which fall within the scope of the appended claims.

I claim:

1. A film gate unit comprising an aperture frame, a film guide confining the margins of a film strip but being recessed from the record portion of said strip, driving means for oscillating said frame and said guide relative to each other, means resiliently associated with said guide for flattening said record portion during exposure against said aperture frame, and resilient means intermediate said guide and said driving means, said resilient means and said flattening means leaving said guide free to stop at varying distances from said frame irrespective of the relative positions of guide and driving means.

2. In a motion picture machine, an aperture frame, a film guide having recessed film leaves continuously confining the margins of the film strip by permitting free progress of the record portions of the film, means for reciprocating said film guide towards and from said frame and means intermediate said confined margins and moving in synchronism with said reciprocating means for flattening the film during the exposure period.

3. A film gate unit comprising two film leaves with guide portions continuously engaging the film margins, forming recessed central portions permitting free progress of the film and a film leaf aperture, means for reciprocating said leaves from and into exposure position, cross rails in said leaves forming the transverse sides of said aperture, and means for removing said rails from the progressing film and for pressing them towards the film in the exposure position.

4. A film gate unit comprising a film guide having film leaves continuously confining the margins of the film and recessed away from the record area portions, means for intermittently moving said film strip through said guide, stationary means for registering the film, means for reciprocating said guide thereby engaging a film therein periodically with said registering means, and means associated with said guide for flattening the film into the image plane without obstructing the record if said guide is in exposure position.

5. A film gate unit comprising two film leaves with aperture portions continuously engaging the film margins, having recessed center portions permitting free progress of the film and forming a film leaf aperture, means for reciprocating said leaves from and into exposure position, cross rails eccentrically journaled in said gate and having cams fixed thereto, resilient means tending to keep the edges of said rails flush with said film leaf aperture, and stops associated with the stationary part of said gate, said stops and said cams turning said edges into film engaging position flush with the leaf aperture if said leaves are in exposure position, and removing said edges from the leaf aperture in the non-exposure position.

6. A film gate unit comprising an aperture frame, a film guide continuously confining the film strip margins but recessed from the record portion of the film, actuating means for oscillating said guide, a resilient member interposed between said actuating means and said guide, and means resiliently contacting during exposure with the transverse film picture margins, said resilient member and said contacting means flattening said film during exposure by pressing the film picture margins against said aperture frame.

7. A film gate unit comprising a frame having an aperture, film guiding means continuously engaging both longitudinal margins of the film record portion before said frame but being recessed from said record portion, means for pressing during the exposure period the transverse picture margins of said film against said frame while leaving said aperture unobstructed and means for withdrawing said pressure means from said film during its progress in said guiding means.

8. In a motion picture machine, film guiding means continuously confining both longitudinal margins of the record portion of a film strip, means for moving a film through said guiding means, means for substantially confining the transverse margins on both sides of said portion in the exposure position thereof, and means connected with said moving means for releasing both sides of said portion during its progress through said guiding means.

MALCOLM H. AMES.